United States Patent
Minami et al.

(10) Patent No.: US 6,932,937 B2
(45) Date of Patent: Aug. 23, 2005

(54) METHODS AND APPARATUS FOR MANUFACTURING MOLDED ARTICLES

(75) Inventors: Nobuhiro Minami, Toyota (JP); Tamotsu Nagaya, Nishio (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 396 days.

(21) Appl. No.: 10/091,259

(22) Filed: Mar. 5, 2002

(65) Prior Publication Data

US 2002/0125616 A1 Sep. 12, 2002

(30) Foreign Application Priority Data

Mar. 6, 2001 (JP) ........................................ 2001-062307

(51) Int. Cl.⁷ ................................................ B29D 9/00
(52) U.S. Cl. ...................... 264/511; 264/161; 264/163; 264/259; 264/260; 264/554; 425/289; 425/292; 425/510; 425/806
(58) Field of Search ........................... 264/511, 35, 550, 264/554, 161, 163, 259, 260; 425/510, 289, 292, 806

(56) References Cited

U.S. PATENT DOCUMENTS 4,469,655 A    9/1984   Kiss
5,658,511 A    8/1997   Nicolay
5,759,594 A *  6/1998   Masui et al. ................. 425/510
5,811,053 A *  9/1998   Ota et al. .................... 264/511
5,834,037 A * 11/1998   Wu ....................... 425/174.8 R
6,368,546 B1 * 4/2002   Sakamoto .................... 264/553

FOREIGN PATENT DOCUMENTS

JP           11048877 A      2/1999
JP          411077691 A  *   3/1999   ........... B29C/33/14

OTHER PUBLICATIONS

English Language Translation of JP 411077691A.*

* cited by examiner

*Primary Examiner*—Chris Fiorilla
*Assistant Examiner*—Michelle Acevedo Lazor
(74) *Attorney, Agent, or Firm*—Patterson, Thuente, Skaar & Christensen, P.A.

(57) ABSTRACT

Apparatus for manufacturing a molded article having a substrate material and skin material may include a first die that receives and supports the substrate material and a second die that receives and supports the skin material. The first die is arranged and constructed to engage the first die. A cutter may be provided on the first molding die. The cutter can be actuated when the second die moves toward the first die in order to partially cut away the substrate material.

5 Claims, 3 Drawing Sheets

METHODS AND APPARATUS FOR MANUFACTURING MOLDED ARTICLES

BACKGROUND OF THE INVENTION

1. Field of the Invention

The present invention relates to methods and apparatus for manufacturing a molded article. More particularly, the present invention relates to methods and apparatus for manufacturing a board-like molded article, such as a door trim board of a vehicle.

2. Description of the Related Art

A known board-like molded article (hereinafter referred to as a "molded board") is taught by, for example, Japanese Laid-open Patent Publication Number 11-48877. In this known art, wood-based fibrous materials, resin-based fibrous materials and reinforcement fibrous materials are blended or mixed, to thereby form a fiberboard (substrate material). Thereafter, the fiberboard is heated to an appropriate temperature in order to soften the fiberboard. After heat treatment, the softened substrate material is placed in a press die of a cold press molding apparatus together with a skin material, and then the substrate material and the skin material are cold pressed in one step. Thus, the substrate material and the skin material are integrally molded, to thereby form an unfinished molded board. The peripheral edge of the unfinished molded board thus formed is cut or trimmed after being removed from the molding apparatus, to thereby form a molded board having a desired outer dimension or size.

Generally speaking, the unfinished molded board is trimmed such that only the substrate material is cut or trimmed, so that the skin material covers the peripheral cut end surface of the substrate material. As will be appreciated, if the skin material is simultaneously cut, so as to have substantially the same dimension as the substrate material, the peripheral cut end surface of the substrate material cannot be covered by the skin material. In such case, the uncovered or bare cut end surface of the substrate material may impart a course or unfinished appearance to the molded board.

SUMMARY OF THE INVENTION

It is, accordingly, one object of the present teachings to provide improved methods and apparatus for manufacturing a molded article.

In one embodiment of the present teachings, methods are taught for manufacturing a molded article that comprises a substrate material and skin material. In these methods, for example, the substrate material and the skin material are press molded to form an integral molded board. Further, the peripheral edge of the substrate material is preferably cut in order to remove an unnecessary portion of the substrate material More preferably, the substrate material is cut while the substrate material and the skin material are being molded. For example, the substrate material may be cut before the molding process is completed. Further, the skin material is not cut, so that an excess portion of the skin material can be folded over the peripheral edge of the cut substrate material in order to impart a finished appearance to the molded board.

Thus, the molded article may be trimmed during the molding. Further, because only the substrate material is trimmed without cutting the skin material, it is not necessary to perform an additional trimming operation of the molded article after the molding step, thereby reducing the efforts and costs necessary to prepare a molded board having a skin material disposed along the peripheral cut edge of the substrate material.

In another aspect of the present teachings, apparatus for manufacturing a molded article that comprises a substrate material and skin material are taught. For example, the apparatus may include a first die that receives the substrate material thereon and a second die that receives the skin material thereon. The first die engages the second die in order to press mold the substrate material and skin material therebetween. A cutter or a cutting implement is preferably disposed on the first molding die. Preferably, the cutter operates when the second die moves towards the first die in order to partially cut away a peripheral edge of the substrate material without cutting the skin material.

In one embodiment of the present teachings, the cutter or cutting implement may comprise a first cutter element (or first cutting element) and a second cutter element (or second cutting element). For example, the first cutter element may be a cutter blade (or cutting blade) or a knife that cuts the substrate material when the second die moves towards the first die. The second cutter element may comprise a cutting edge that is formed on the first die. Optionally, the cutter blade may move between a retracted position and a projected position. The cutter blade preferably cuts the substrate material in the projected position. In addition, an actuator may be coupled to the cutter blade, so as to timely move the cutter blade from the retracted position to the projected position. Further, a retainer may receive the cutter blade such that the retainer will contact the first die in order to define the projected position.

Other objects, features and advantage of the present invention will be ready understood after reading the following detailed description together with the accompanying drawings and the claims.

DETAILED DESCRIPTION OF THE INVENTION

In one embodiment of the present teachings, a substrate material and a skin material are molded. At the same time, the substrate material is cut in order to remove an unnecessary portion from the substrate material. Preferably, the substrate material is cut at or before the substrate material and the skin material is completely molded. More preferably, the skin material is not cut when the substrate material is cut. Thus, the portion of the skin material that is not supported by the substrate material after the substrate material has been cut may be folded over the edge of the substrate material. As a result, the edge of the substrate material may be covered by the skin material, thereby providing a molded board having a nice outer appearance.

The present methods are not limited to any particular use or application. However, the present method may advantageously be utilized to manufacture a board-like molded article, e.g., a door trim board for a vehicle.

In another embodiment of the present teachings, an apparatus for manufacturing the substrate material and the skin material may comprise a first die that receives the substrate material thereon, a second die that receives the skin material thereon and is engageable with the first die, and a cutter disposed on the first molding die. Preferably, the cutter can be operated based upon relative motion of the first and second dies, to thereby partially cut away a peripheral edge of the substrate material.

Preferably, the cutter comprises a first cutter element and a second cutter element. The first cutter element cooperates with the second cutter element based upon relative motion of the first and second dies, to thereby cut the substrate material. Optionally, the first and second cutter elements are disposed on or proximal to the first die. The first and second cutter elements may comprise a cutter blade that is movable in a direction of the relative motion of the first and second dies and a cutting edge that is formed in the first die. The cutter blade may move to cooperate with the cutting edge based upon relative motion of the first and second dies.

Optionally, the cutter blade is adapted to move between a retracted position and a projected position. The cutter blade may move to the projected position from the retracted position when the first and second dies reach a predetermined position relative to each other. Further, an actuator may be coupled to the cutter blade, so as to move the cutter blade to the projected position when the first and second dies reach the predetermined position relative to each other. Optionally, the cutter blade is received in a retainer, so that the retainer contacts the first die when the cutter blade is moved, to thereby define the projected position. Further, a vacuum source preferably communicates with the second die, so that the skin material can be preformed by vacuum forming.

DETAILED REPRESENTATIVE EMBODIMENTS

Figure 1:
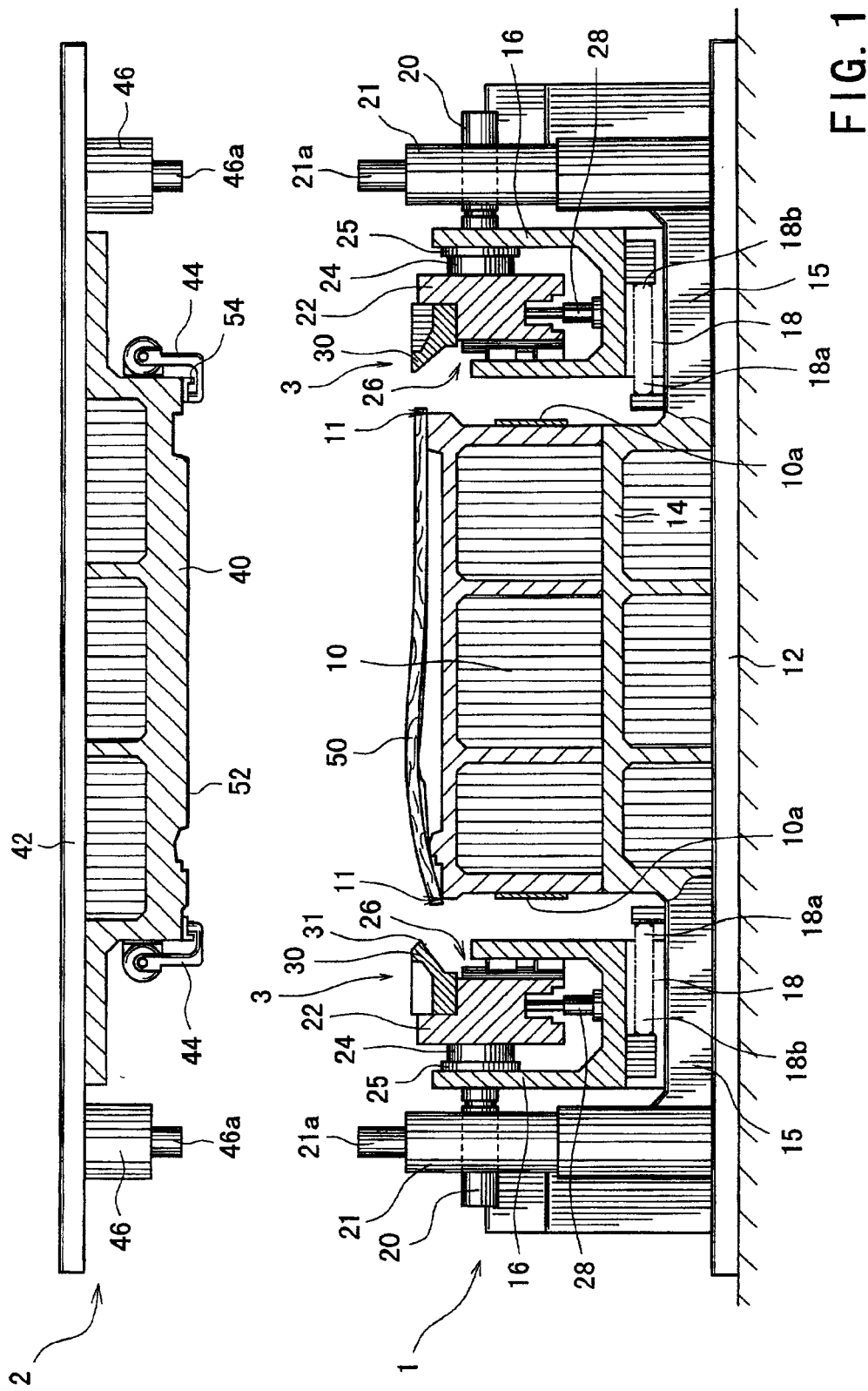
FIG. 1 is a longitudinal sectional view of an apparatus for manufacturing a molded article according to a representative embodiment of the present teachings, illustrating a condition in which upper and lower dies are opened.
Figure 2:
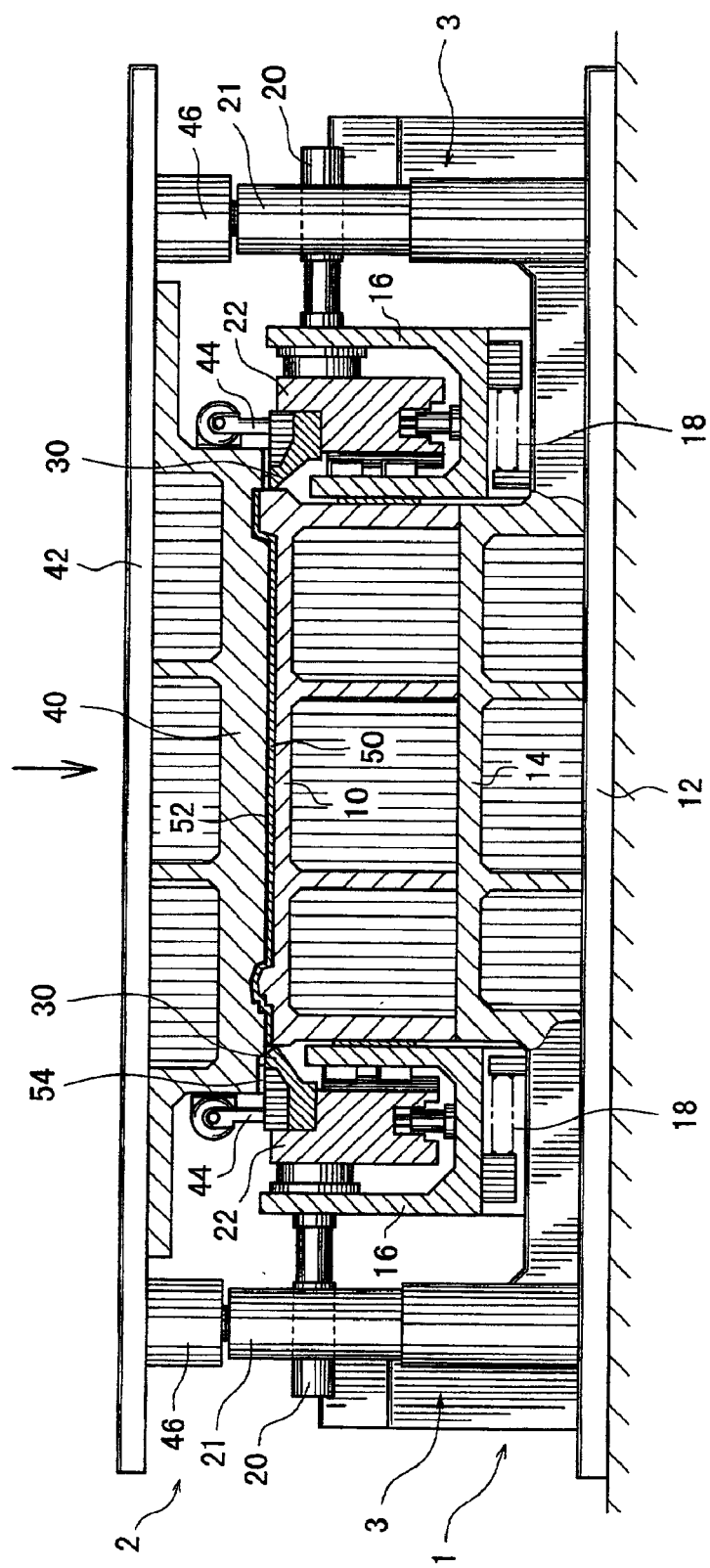
FIG. 2 is a sectional view similar to FIG. 1, illustrating a condition in which the upper and lower dies are closed.
Figure 3:
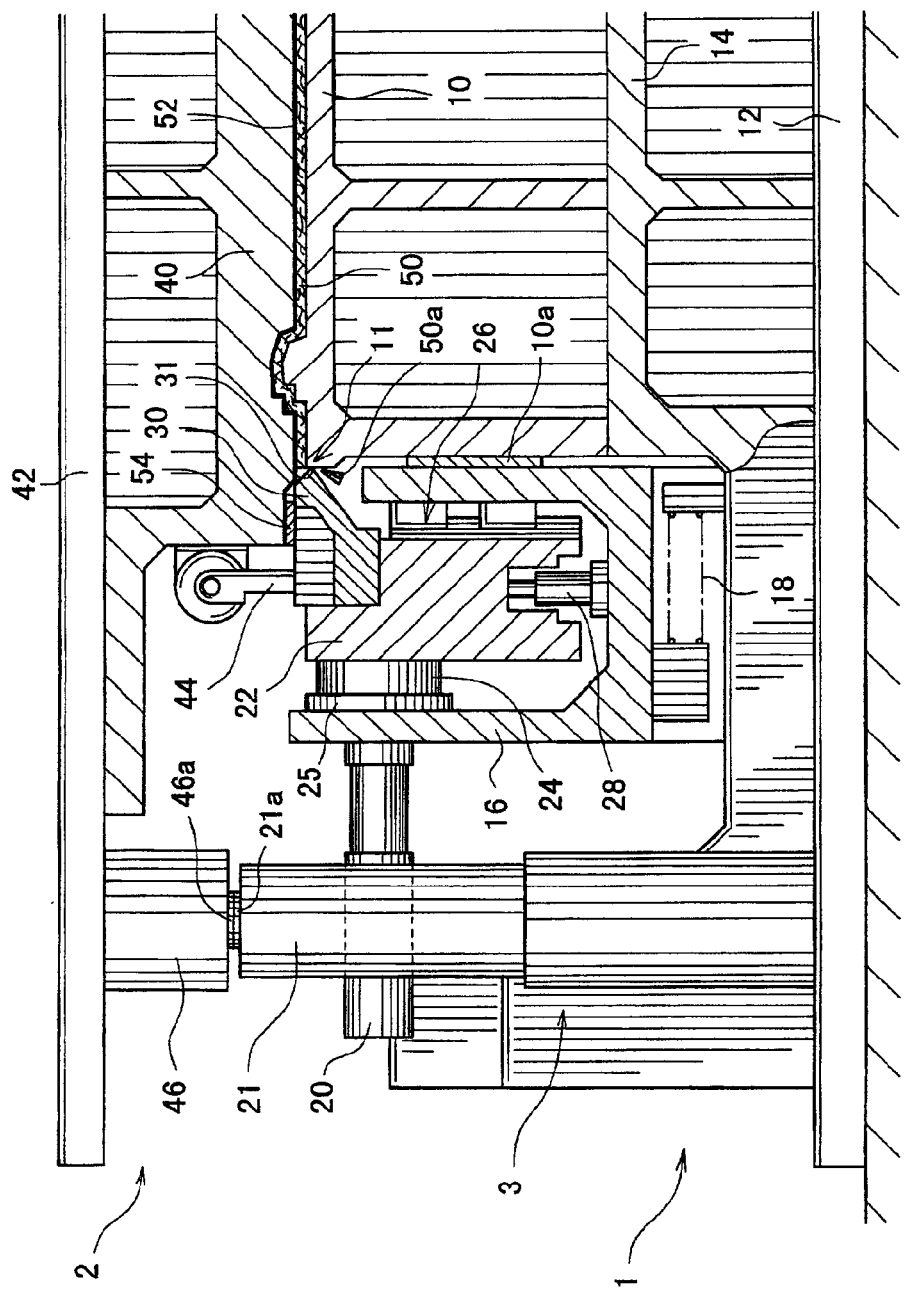
FIG. 3 is a partially enlarged view of FIG. 2.

A preferred representative embodiment of the present teachings is shown in FIGS. 1 to 3, in which a door trim board is exemplified as a molded article that can be prepared utilizing the present teachings.

As best shown in FIG. 1, an apparatus for manufacturing the door trim board may comprise a lower die assembly 1 and an upper die assembly 2. The lower die assembly 1 has a first or lower die 10, and a first or lower mount 12 that is fixedly mounted on a floor. The upper die assembly 2 has a second or upper die 40, and a second or upper mount 42 that can move upwards and downwards with respect to the lower mount 12. However, both the lower die 10 and the upper die 40 may be movable or the upper die 40 may be fixed in position while the lower die 10 moves. According to the present teachings, it is only necessary that the lower die 10 moves relative to the upper die 40, so that the substrate material and skin material can be molded therebetween. Furthermore, the lower die 10 and upper die 40 are not required to be disposed in a vertical relationship, but may also be disposed in a horizontal relationship or any other relationship that allows the substrate material and skin material to be molded therebetween.

The lower die 10 may be attached to the lower mount 12 via a base frame 14. The base frame 14 has a pair of side extensions 15 and is affixed to the upper surface of the lower mount 12. The lower die 10 has a first or lower molding surface that is formed in the upper surface of the lower die 10. As will be appreciated, the lower molding surface is adapted to receive a substrate material 50 (which will be hereinafter described), and may be shaped to substantially correspond to the outer profile of a door trim board. In addition, the lower die 10 may include a second cutter element or circumferential cutting edge 11 that extends along the molding surface.

The lower die assembly 1 further includes a pair of cutter assemblies 3. Each of these cutter assemblies 3 includes a retainer or slide holder 16 that is disposed on the upper surface of the corresponding side extension 15 of the base frame 14. The slide holder 16 is preferably adapted to move along the side extension 15 toward and away from the lower die 10. Further, each of the cutter assemblies 3 includes a biasing means or return spring 18 that is disposed on the side extension 15, and an actuator or hydraulic cylinder 20 that is mounted on the lower mount 12. A proximal end 18a of the return spring 18 is connected to the side extension 15 and a distal end 18b of the return spring 18 is connected to the bottom wall of the slide holder 16. Therefore, the slide holder 16 is biased toward a retracted position when the upper and lower dies 10, 40 are in an open or non-operating position, as shown in FIG. 1.

On the other hand, the hydraulic cylinder 20 is coupled to the side wall of the slide holder 16. When the hydraulic cylinder 20 is actuated, the slide holder 16 will move laterally toward the lower die 10 against the spring or biasing force of the return spring 18. Further, the hydraulic cylinder 20 communicates with a hydraulic pump 21 having a plunger 21a. As will be recognized, the hydraulic pump 21 is preferably energized when the plunger 21a is pressed, to thereby actuate the hydraulic cylinder 20.

Moreover, each of the cutter assemblies 3 includes a first cutter element or cutter blade 30 having a leading edge 31 that preferably projects toward the cutting edge 11 of the lower die 10. A slide block 22 is vertically slidably received in the slide holder 16 and supports the cutter blade 30. The slide block 22 is coupled to a gas cylinder 28 that is disposed on the bottom wall of the slide holder 16. Therefore the slide block 22 will be raised when the upper and lower dies 10, 40 are opened, as shown in FIG. 1. Optionally, the slide block 22 is vertically guided by a linear bearing 24 and a guide mechanism 26 that are disposed on the respective side walls of the slide holder 16. Therefore, the slide block 22 will reliably move in the vertical direction within the slide holder 16. Further, the linear bearing 24 may include a pre-loading pad 25 that contains, for example, a disk spring (not shown). The pre-loading pad 25 may be utilized to press the linear bearing 24 against the slide block 22, so that the slide block 22 will be reliably guided by the linear bearing 24 and the guide mechanism 26.

Optionally, the side surface of the lower die 10 may include a detent plate 10a that may contact the side wall of the slide holder 16 when the slide holder 16 moves laterally. The detent plate 10a may limit lateral motion of the slide holder 16, to thereby define a projected position of the slide holder 16, as shown in FIGS. 2 and 3. Preferably, in the projected position of the slide holder 16, the leading edge 31 of the cutter blade 30, which is received within the slide holder 16, is substantially vertically aligned with the cutting edge 11 of the lower die 10.

The upper die 40 may be directly affixed to the lower surface of the upper mount 42. The upper die 40 has a second or upper molding surface that is formed in the lower surface of the upper die 40. As will be appreciated, the lower surface of the upper die 40 may be shaped to substantially correspond to the outer profile of the door trim board. The lower surface of the upper die 40 preferably communicates with a vacuum source (not shown). In addition, an appropriate number of clamping devices 44 may be disposed around the upper die 40. As will be appreciated, these clamping devices 44 preferably function to temporarily fix or hold a skin material 52 (which will be hereinafter described) onto the upper molding surface of the upper die 40. Further, the skin material 52 optionally may be attached to a clamping frame 54 and the clamping devices 44 may retain the clamping frame 54 on the lower surface of the upper die 40.

The upper die assembly 2 may further include two hydraulic cylinders 46 that are mounted on the upper mount 42. Each hydraulic cylinder 46 includes a downwardly projecting rod 46a and is positioned opposite to the hydraulic pump 21 of the lower die assembly 1. As will be recognized, the rod 46a is adapted to contact and press the plunger 21a of the hydraulic pump 21 when the upper die assembly 2 is lowered to a predetermined or intermediate level. That is, the rod 46a will automatically press the plunger 21a of the hydraulic pump 21 when the upper die assembly 2 is lowered toward a closed or operating position of the dies 10, 40, as shown in FIG. 2.

Representative methods for manufacturing the door trim board using this apparatus will now be described. First, natural fibrous materials (e.g., wood fiber, flax fiber, kenaf fiber and cotton fiber) are blended or mixed with thermoplastic resin-based fibrous materials (e.g., polypropylene fiber) in order to the substrate material 50, which has a mat-like shape. The substrate material 50 may be preferably heated before molding. On the other hand, the skin material 52 may be made of one or more synthetic resins (e.g., polypropylene). However, like the substrate material 50, the skin material 52 also may be heated before molding.

After moving the upper die assembly 2 upward so as to open the upper and lower dies 10, 40, as shown in FIG. 1, the heated substrate material 50 is disposed or placed on the lower molding surface of the lower die 10. In addition, the heated skin material 52 is attached to the clamping frame 54 and is secured to the upper die 40 by tightening the clamping devices 44. Thus, the skin material 52 will face the upper surface of the lower die 10. Thereafter, the vacuum source is actuated in order to draw or suction the skin material 52 towards the lower surface of the upper die 40. As a result, the skin material 52 will be pre-formed due to the vacuum on the lower surface of the upper die 40 and will be closely retained by the upper die 40.

Subsequently, the upper die assembly 2 is lowered to a predetermined or intermediate level, i.e., where the rod 46a of the hydraulic cylinder 46 contacts and presses the plunger 21a of the hydraulic pump 21. As a result, the hydraulic pump 21 will energized and actuate the hydraulic cylinder 20. The actuated hydraulic cylinder 20 laterally moves the slide holder 16 toward the lower die 10 from the retracted position (FIG. 1) against the spring force of the return spring 18 until the side wall of the slide holder 16 contacts the detent plate 10a. Further, in this embodiment, the predetermined or intermediate level of the upper die assembly 2 preferably corresponds to a level or position before the upper and lower dies 10, 40 are completely closed.

When the slide holder 16 contacts the detent plate 10a (i.e., when the slide holder 16 is shifted to the projected position), as shown in FIGS. 2 and 3, the cutter blade 30 will project or extend over the substrate material 50 that is disposed on the lower molding surface of the lower die 10, because the gas cylinder 28 retains the slide block 22 at a raised position. Also, at this time, the leading edge 31 of the cutter blade 30 is substantially vertically aligned with the cutting edge 11 of the lower die 10. Therefore, the periphery of the substrate material 50 can be reliably cut when the upper die assembly 2 is further lowered from the predetermined or intermediate level.

As described above, in this embodiment, the hydraulic cylinder 20 for moving the slide holder 16 is triggered by the rod 46a of the hydraulic cylinder 46 when upper die assembly 2 is lowered to the predetermined or intermediate level. Therefore, the slide holder 16 can be easily and timely moved into its projected position without requiring additional timing control units.

When the upper die assembly 2 is further lowered toward the operating position of the dies 10, 40 in order to mold the door trim board, the lowered upper die 40 downwardly presses the cutter blade 30 and the slide block 22 against the force of the gas cylinder 28 (FIGS. 2 and 3). As a result, as shown in FIG. 3, the cutter blade 30 and the cutting edge 11 of the lower die 10 cooperate each other to function as a cutting implement and thereby cut the periphery of the substrate material 50. The cut away periphery of the substrate material 50 is removed as an unnecessary or waste portion 50a. Thus, the substrate material 50 can be trimmed before the door trim board is completely molded between the upper and lower dies 10, 40. As will be appreciated, only the substrate material is cut, and the skin material 52 is not cut, because the cutter blade 30 extends underneath the skin material 52. Therefore, the skin material 52 may retain a larger size or dimension than the substrate material 50, and the excess skin material 52 can be utilized to wrap or cover the cut end surface of the substrate material 50.

When the upper die assembly 2 is further lowered and the dies 10, 40 are closed, the substrate material 50 and the skin material 52 are integrally press molded, to thereby form the door trim board in which only the substrate material 50 was trimmed. Thereafter, the clamping device 44 is loosened in order to release the clamping frame 54. At substantially the same time, the upper die assembly 2 is upwardly moved in order to reopen the upper and lower dies 10, 40, so that the formed door trim board can be removed from the apparatus.

When the upper die assembly 2 moves upwardly, the gas cylinder 28 returns the slide block 22 to its raised position. When the upper die assembly 2 is further moved upward, the rod 46a of the hydraulic cylinder 46 disengages the plunger 21a of the hydraulic pump 21. As a result, the hydraulic pump 21 is de-energized or de-activated, to thereby de-actuate the hydraulic cylinder 20. When the hydraulic cylinder 20 is de-actuated, the slide holder 16 returns to the retracted position due to the spring force of the return spring 18. Thus, one cycle of a process for manufacturing a door trim board is completed.

Further, according to the present methods, the skin material 52 will reliably adhere to the substrate material 50 due to the thermoplastic resin-based fibrous materials contained within the substrate material 50. Therefore, it is not necessary to apply adhesives to the substrate material 50 or the skin material 52 in order to obtain a desired adhesive force between the substrate material 50 and the skin material 52.

According to the present methods, the door trim board is trimmed during the press molding operation. In addition, only the substrate material 50 is trimmed. Therefore, an additional operation to trim the molded trim board is not required after completion of the press molding operation, thereby reducing manufacturing costs and improving the appearance of the finished molded board.

Further, in the present methods, when the slide holder 16 moves laterally, the slide holder 16 contacts the detent plate 10a disposed on the side surface of the lower die 10. As a result, the cutter blade 30 can be reliably positioned over the lower die 10, such that the leading edge 31 of the cutter blade 30 is substantially vertically aligned with the cutting edge 11 of the lower die 10. In other words, in the present methods, the side surface of the lower die 10 is utilized as a reference for positioning the cutter blade 30. Therefore, even if the lower die 10 thermally expands due to continuous operation of the apparatus, the relative positions of the cutter blade 30 and the lower die 10 will not change. As a result, the vertical alignment of the leading edge 31 of the cutter blade 30 and the cutting edge 11 of the lower die 10 does not change, thereby enabling optimal cutting of the substrate material 50.

However, at even if the relative position of the cutter blade 30 and the lower die 10 do not change, the leading edge 31 of the cutter blade 30 may possibly become misaligned with the cutting edge 11 of the lower die 10. Such misalignment may result, for example, from non-uniform expansion of the lower die 10 (in particular, excessive expansion around the cutting edge 11). Further, such misalignment may cause the leading edge 31 to contact the cutting edge 11 when the upper die 40 downwardly presses the cutter blade 30. However, because the pre-loading pad 25 supports the slide block 22, which supports the cutter blade 30, the cutter blade 30 may easily retract or displace in the event that the leading edge 31 contacts the cutting edge 11. As a result, the leading edge 31 of the cutter blade 30 can properly engage the cutting edge 11 of the lower die 10, to thereby cut the substrate material 50.

As discussed above, the cutter blade 30 is included in the cutter assembly 3 that is mounted on the lower mount 12, and the cutting edge 11 is formed in the lower die 10 that is mounted on the lower mount 12. Therefore, even if the upper mount 42 inclines with respect to or deviates from the lower mount 12 when the upper die assembly 2 is lowered to close the upper and lower dies 10, 40, the cutting function of the leading edge 31 and the cutting edge 11 is not influenced by such inclination and/or deviation.

Although two cutter assemblies 3 are respectively provided on the sides of the lower die 10 in the representative embodiment, three or more cutter assemblies can be provided around the lower die 10, if necessary. For example, two additional cutter assemblies can be provided across the lower die 10. In addition, because the gas cylinder 28 basically serves as a biasing means for the slide holder 22, the gas cylinder 28 may be replaced with another type of biasing means, such as a coil spring, if necessary or desired.

Representative examples of the present invention have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

Moreover, additional examples of relevant methods and apparatus for manufacturing a molded article are found in U.S. Pat. Nos. 5,658,511 and 4,469,655, and Japanese Laid-Open Patent Publication No. 11-48877, the contents of which are hereby incorporated by reference.

What is claimed is:

1. A method for manufacturing a molded article that comprises a substrate material and a skin material, comprising:

press molding the substrate material and the skin material by closing a first die that receives the substrate material and a second die that receives the skin material; and cutting a peripheral portion of the substrate material at or before completion of the molding step in order to remove an unnecessary or waste portion from the substrate material, but without cutting the skin material such that a cutter blade moves laterally from a retracted position to a projected position prior to the closing of the first and second dies, and moves vertically along a direction of the closing of the first and second dies when the first and second dies close, so as to cooperate with a cutting edge formed on the first die, to thereby cut the substrate material.

2. A method as defined in claim 1, wherein the substrate material comprises a mixture of natural fibrous materials and thermoplastic resin-based fibrous materials, and wherein the substrate material and the skin material are heated prior to or during the molding step.

3. A method as defined in claim 2, further comprising drawing a vacuum to pre-form the skin material received within the second die prior to closing the first and second dies.

4. A method as defined in claim 1, wherein the substrate material comprises a mixture of natural fibrous materials and thermoplastic resin-based fibrous materials, and wherein the molding step further comprises heating and pressing the substrate material and the skin material.

5. A method as defined in claim 1, wherein the molding step further comprises folding an excess portion of the skin material along a side edge of the substrate material and molding the skin material to the side edge of the substrate material after the side edge of the substrate material was cut but before completion of the molding step.

* * * * *